United States Patent [19]
Leong et al.

[11] Patent Number: 5,513,342
[45] Date of Patent: Apr. 30, 1996

[54] DISPLAY WINDOW LAYOUT SYSTEM THAT AUTOMATICALLY ACCOMMODATES CHANGES IN DISPLAY RESOLUTION, FONT SIZE AND NATIONAL LANGUAGE

[75] Inventors: Kevin K. Leong, San Jose, Calif.; Robert D. Love, Apex; Hiroshi Tsuji, Cary, both of N.C.

[73] Assignee: International Business Machines Corporation, Armonk, N.Y.

[21] Appl. No.: 174,898

[22] Filed: Dec. 28, 1993

[51] Int. Cl.$^6$ .................................................. G06F 3/14
[52] U.S. Cl. ............................................................ 395/157
[58] Field of Search ................................... 395/148, 157, 395/155

[56] References Cited

U.S. PATENT DOCUMENTS

| | | | |
|---|---|---|---|
| 4,574,364 | 3/1986 | Tabata et al. | 364/900 |
| 4,675,830 | 6/1987 | Hawkins | 364/518 |
| 5,001,697 | 3/1991 | Torres | 364/521 |
| 5,151,974 | 9/1992 | Tani et al. | 395/128 |
| 5,175,813 | 12/1992 | Golding et al. | 395/157 |
| 5,208,906 | 5/1993 | Morgan | 395/148 |

OTHER PUBLICATIONS

Cohen et al., "Constraint–Based Tiled Windows", IEEE Computer Society, 1985, pp. 1–11.
IBM C/C++Tools Version 2.0: 'User Interface Class Library Reference' May 1993, IBM Part Number: 61G1179, Denmark.
IBM C/C++Tools: 'User Interface Class Library User's Guide, Version 2.01' Nov. 1993, IBM Part Number: 82G3743, Denmark.
IBM Technical Disclosure Bulletin Feb. 1–10, 1990, New York, US EPO Search Report.

*Primary Examiner*—Raymond J. Bayerl
*Assistant Examiner*—Ba Huynh
*Attorney, Agent, or Firm*—Ohlandt, Greeley, Ruggiero & Perle

[57] ABSTRACT

A graphical user interface display window configurations containing user-readable data and is implemented by a software presentation system. The software presentation system automatically adjusts window size and positioning in accordance with window environment changes (e.g. changes in user readable data and/or window resolution). The method includes the steps of: establishing through operation of the presentation system, a display including windows with user-readable data; detecting a change in window environment; responding automatically to the change in window environment to determine windows in the display that require a size adjustment; recalculating the size of each window that requires adjustment; and operating a layout routine to reposition windows in the display in accordance with predetermined spacing and positioning parameters.

7 Claims, 8 Drawing Sheets

"SET CANVAS"

USER "DIALOG" BOX

☐ Person Data

*Select your lunch preferences:*

Food
- ☐ Hamburger
- ☐ *Cheeseburger*
- ☐ Hot dog
- ☐ Pizza

Beverage
- ☐ Milk
- ☐ Soft drink
- ☐ Juice
- ☐ *Water*

Side orders
- ☐ Salad  ☐ Fries
- Other: *Escargot*

[ OK ]  [ *Cancel* ]  [ Help ]

MULTI-CELL CANVAS.

DISPLAY WINDOW LAYOUT SYSTEM THAT AUTOMATICALLY ACCOMMODATES CHANGES IN DISPLAY RESOLUTION, FONT SIZE AND NATIONAL LANGUAGE

FIELD OF THE INVENTION

This invention relates to computer systems that employ a graphical user interface and, more particularly, to a graphical user interface that automatically adjusts displayed windows in accordance with changes in display resolution, font size, national language and window size changes made by a user.

BACKGROUND OF THE INVENTION

Many software applications employ graphical user interfaces that exhibit arrangements of windows containing user-readable data. Programmers have realized that such graphical user interfaces must have an ability to execute with a variety of display resolutions, font sizes or languages. It has been postulated that a software system that produces a graphical user interface provide at least the following support mechanisms: (1) a mechanism to place user interface objects on the screen independent of parameters such as display resolution, font size or language; (2) a mechanism to detect when a current user interface environment has changed and to adjust accordingly. Such an environment change may be, for example, a change in font size; (3) a mechanism that automatically recalculates sizes and positions of displayed objects, based on changes in environment; and (4) an ability to distribute available display space in a visually pleasing manner.

Prior art systems have attempted to solve the first mechanism by providing so called "dialog editors", such as that provided by OS/2 (available from the IBM Corporation). A dialog editor provides an ability to separate text of an application from the executable code. The dialog editor generates separate templates for handling differences in font, display resolution, and language. A typical solution is to design a window layout that contains sufficient space to handle as broad a range of conditions as possible and to restrict the software application program to that predefined range. Such a solution impacts the software industry's ability to support national languages, especially those with ideographic characters (due to the amount of additional code that must be written).

Other prior art systems require that the software programmer be cognizant of an environment change and adjust the window dimensions on an interactive basis. Examples of such prior art may be found in the following U.S. patents. U.S. Pat. No. 4,574,364 to Tabata et al. describes a window management system that provides commands which enable a user to vary the size and position of windows. U.S. Pat. No. 5,151,974 to Tani et al. describes a graphic data processing system wherein the size of a window is judged and, based on the detected size, graphic data of an appropriate "concept" level is displayed within the window. Thus, the larger the window, the more detailed the information that can be displayed therein and vice versa.

U.S. Pat. No. 5,001,697 to Torres describes a displayed window system which allows an operator to dynamically vary window size after an initial window has been displayed, e.g. by movement of a mouse. If the window size is decreased, the amount of decrease is calculated and a character set having appropriate width and height attributes is employed with the changed window size. U.S. Pat. No. 5,175,813 to Golding et al. describes a windowing system which presents logical windows as two separate parts. The first part includes the border and non-scrollable text and the second part includes scrollable text. The separate parts are displayed on the screen as a single window. U.S. Pat. No. 4,675,830 to Hawkins describes a method for producing scalable contour data which both stretches and/or compresses character contours to bring specified contour points into proper alignment with a preestablished grid.

A requirement for user interaction to enable a graphical interface to cope with a changed font, display resolution or language is to be avoided. This is especially important when products employing a graphical interface are marketed on a world-wide basis and experience a multiplicity of environments, depending upon the country of purchase.

Accordingly, it is an object of this invention to provide an improved method and system for control of a graphical user interface that automatically alters the interface in accordance with a changed environment.

It is another object of this invention to provide an improved method for control of a graphical user interface that automatically adjusts window size to accommodate changes in font size, resolution, or language.

It is a further object of this invention to provide an improved graphical user interface that alters a window presentation in accordance with environment changes, in a manner transparent to the application programmer.

SUMMARY OF THE INVENTION

A graphical user interface displays window configurations containing user-readable data and is implemented by a software presentation system. The software presentation system automatically adjusts window size and positioning in accordance with window environment changes (e.g. changes in user readable data and/or window resolution). The method includes the steps of: establishing through operation of the presentation system, a display including windows with user-readable data; detecting a change in window environment; responding automatically to the change in window environment to determine windows in the display that require a size adjustment; recalculating the size of each window that requires adjustment; and operating a layout routine to reposition windows in the display in accordance with predetermined spacing and positioning parameters.

DESCRIPTION OF THE DRAWINGS

FIG. 5 illustrates an affect on the window presentation of FIG. 3 of a change in font size in a system that incorporates the invention.

DETAILED DESCRIPTION OF THE INVENTION

Prior to describing the details of the invention, certain terms will be defined. The concept of windows in a graphical window presentation is well known and fully discussed in the prior art. This invention makes use of a special class of windows that are likened to "canvas" containers that are able to hold plural subsidiary windows and to automatically rearrange them within the "canvas" container. Hereafter, such special class of window is called a "canvas window". Subsidiary windows within a canvas window are hereafter termed "child" windows.

The invention employs two types of canvas windows, i.e. a "set" canvas window and a "multi-cell" canvas window. Each canvas window type includes an embedded layout routine that handles the layout format of child windows within the canvas window type. It is to be understood that a child window of a "parent" canvas window may be another canvas window, allowing construction of very complex layouts. In general, only canvas windows include a layout routine that enables rearrangement of included child windows. Child windows report their status to the parent canvas window which then automatically operates its layout routine, the details of which will be described below.

The following is a selected listing of child window types that may be used with this invention:
Static text field (read only text);
Entry field (single line data entry);
Multi-line edit field (multiple line data entry);
Various buttons (push-button, spin-button);
Container of objects (a selectable, movable list of graphical icons);
Slider (a movable bar like a status indicator or thermometer); and
"Radio" buttons that are individually selectable.

A variety of environment changes can cause a canvas window layout to alter the size of a child window.

1. A change in the font used by a child window. The font size may be changed by either the end user or the application that is displaying the window.
2. A change in the data displayed by the child window which causes the child window to need more or less space in the canvas window.
3. A change in the size of a neighboring child window, if the change requires the canvas window to resize other child windows to maintain visual relationships.
4. A change in the size of the canvas window itself, where the canvas window includes child windows whose sizes are to be synchronized with the canvas window.

Figure 1:
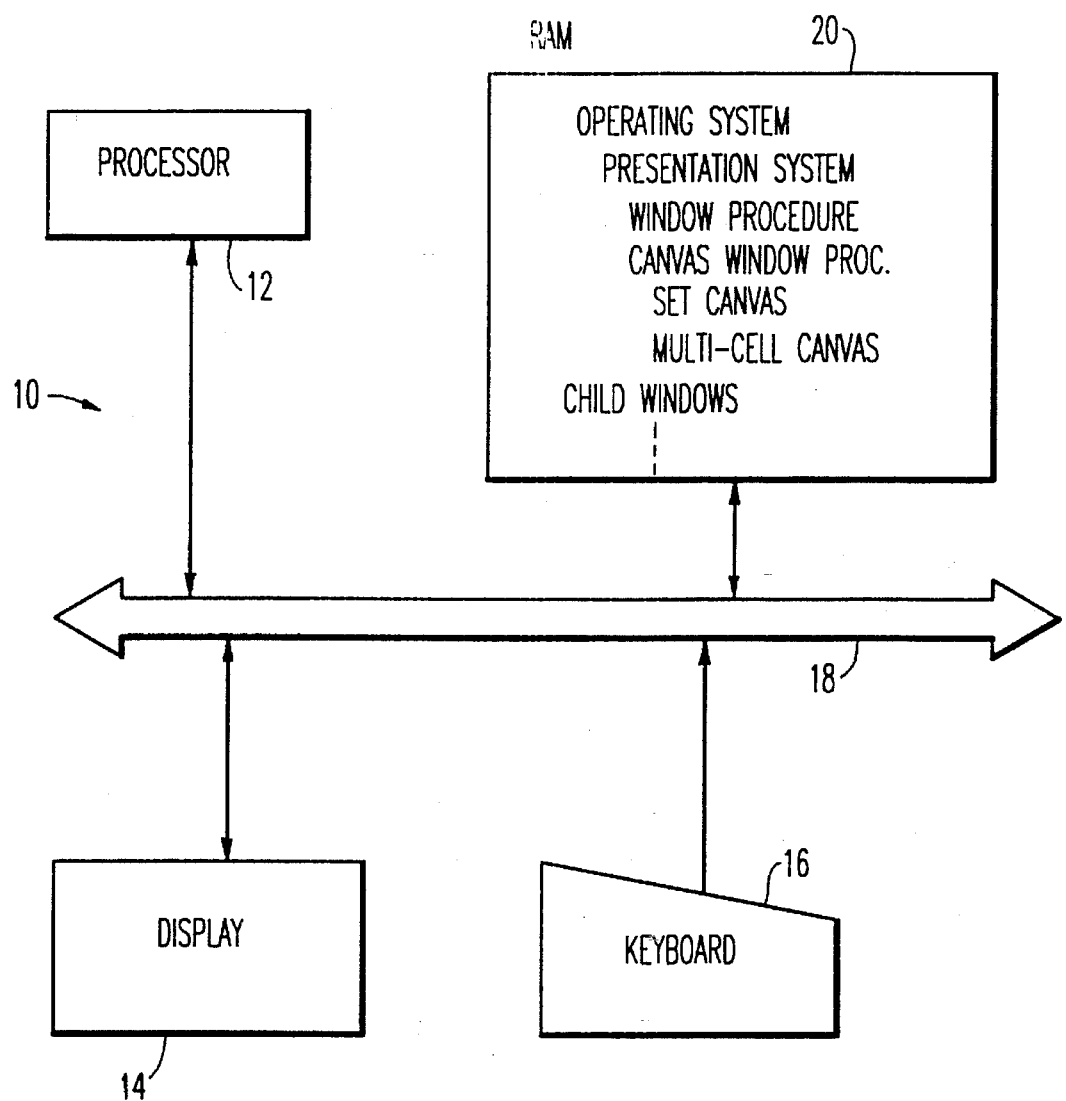
FIG. 1 is a high level diagram of a computer system for performing the invention hereof.

In FIG. 1, a block diagram of a computer 10 illustrates the main subcomponents required to carry out the invention. Computer 10 includes a processor 12, a display 14 and keyboard 16 that are all interconnected via a bus 18. Display 14, in the known manner, displays a graphical interface that is employed by the user to communicate with computer 10. A random access memory (RAM) 20 includes software that controls the operation of computer 10.

RAM 20 stores an operating system that includes a presentation system which, in conjunction with processor 12, controls the operation of display 14 and keyboard 16. Within the presentation system is a window procedure that enables generation of windows on display 14 which include user-readable data. A subset of the window procedure is a software routine that enables the establishment of canvas windows. As above-indicated, the canvas window procedure enables creation of at least two different types of canvas windows, i.e., a set canvas window or a multi-cell canvas window, each of which has its own subroutine to enable size and position adjustment of child windows. RAM 20 also contains data structures that define each of the child windows.

Figure 2:
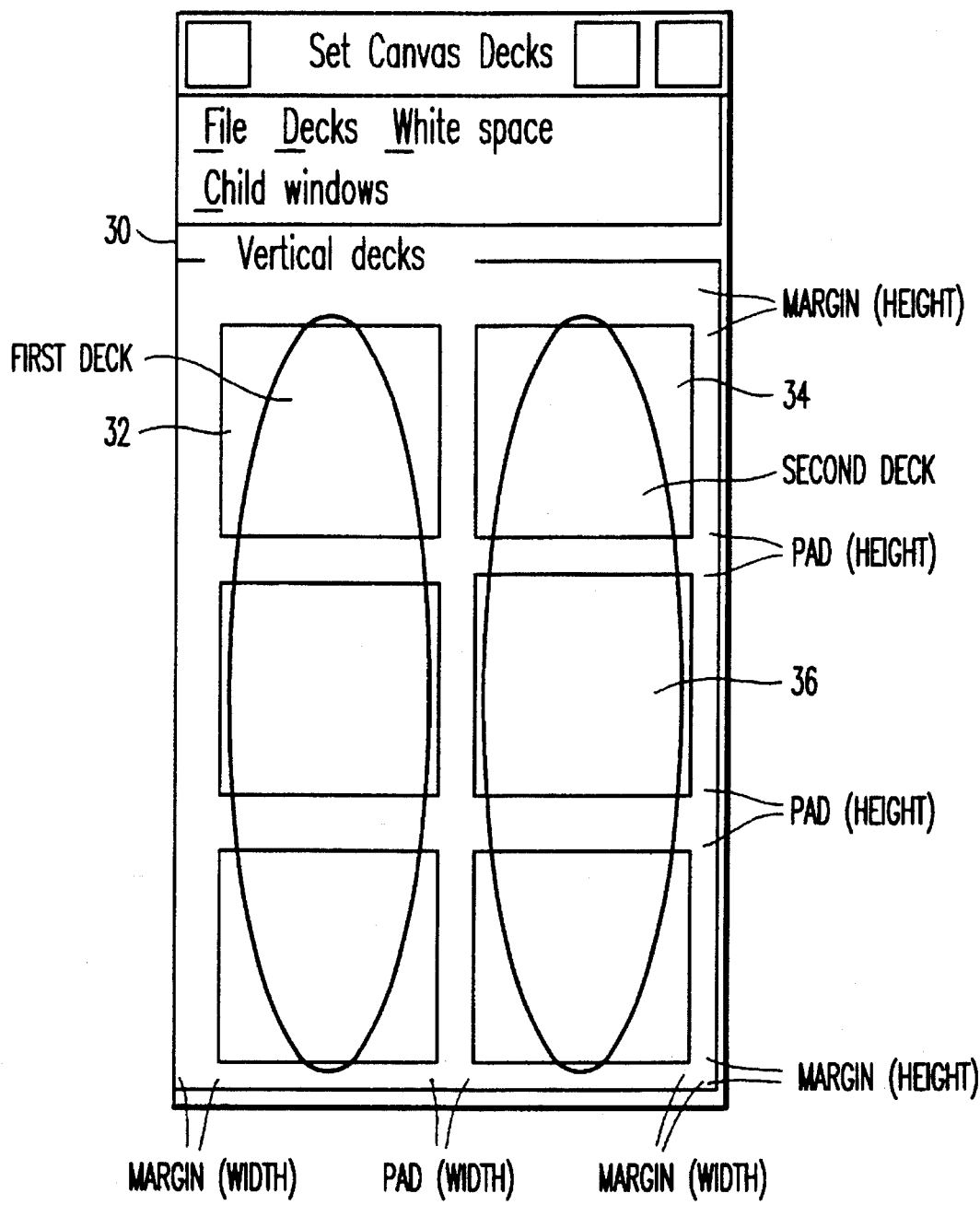
FIG. 2 illustrates a first class of window presentation termed a "set canvas".

In FIG. 2, a set canvas window 30 is shown which includes a plurality of child windows 32, 34, 36, etc. A set canvas window arranges its child windows into either vertical or horizontal rows termed decks. Generally, a set canvas window is best suited for similarly sized child windows, like a row of push buttons, a group of check boxes, a row or column of icons. FIG. 2 also illustrates a variety of prespecified values which define child window separation and window margins used to embody a set canvas window. For instance, both the width and height of margins are initially specified as are "pads" that separate adjacent child windows.

Figure 3:
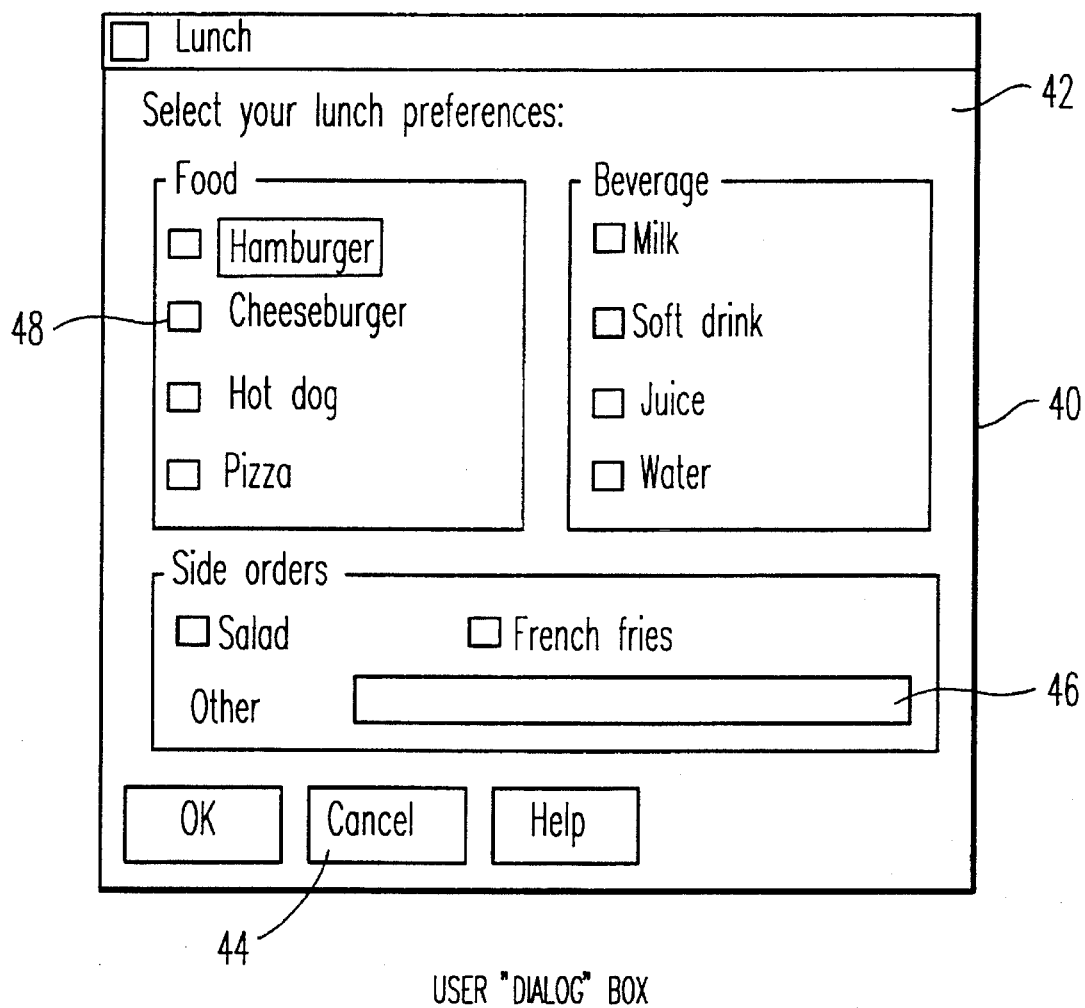
FIG. 3 illustrates a window presentation (e.g. dialog box) that enables a user to make a selection by clicking on a selection box.
Figure 4:
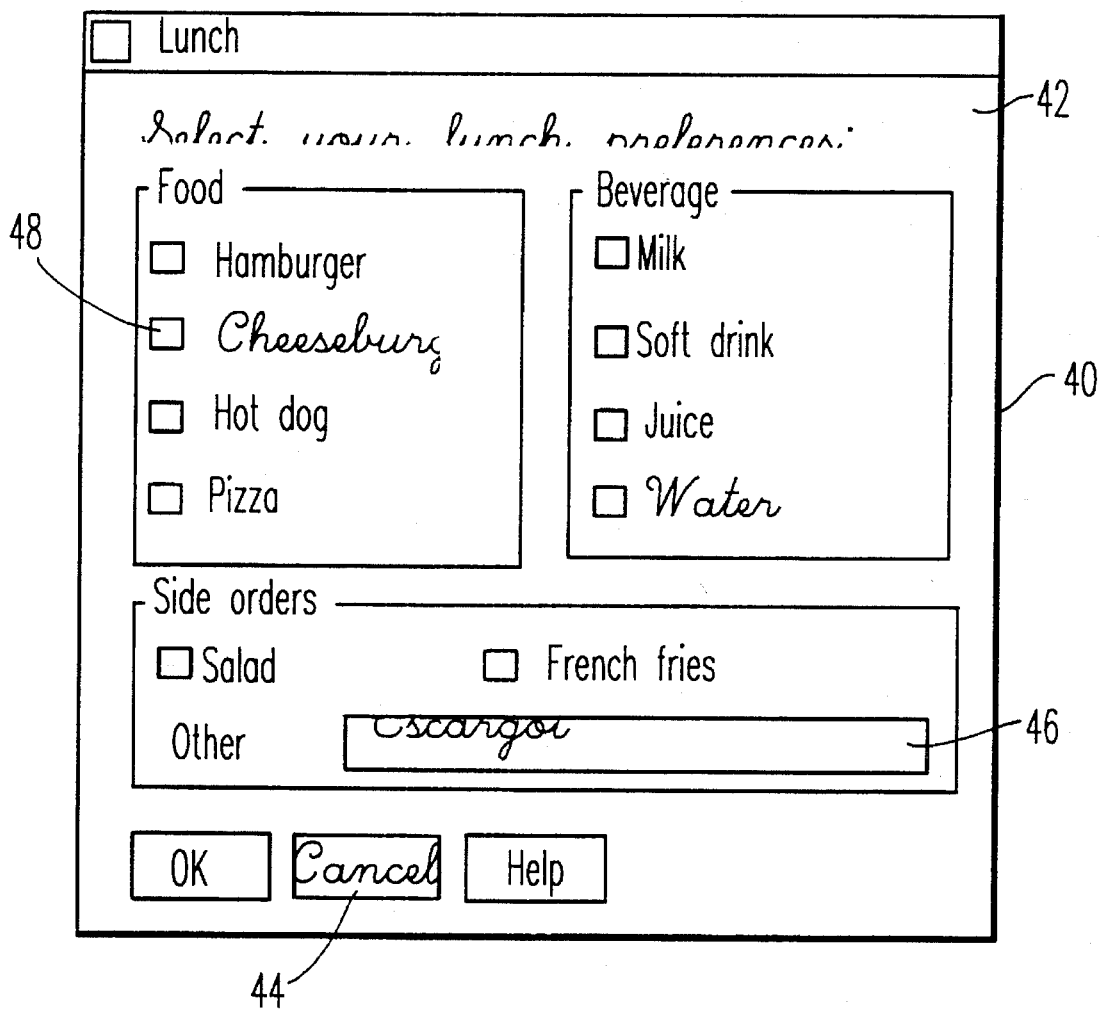
FIG. 4 illustrates an affect on the window presentation of FIG. 3 of a change of font size in a system that does not implement the invention.

In FIG. 3, a window presentation 40 is illustrated that enables a user to make a selection by moving a cursor to a selection box and "clicking" on the box. Upon making a selection, the selected item may be displayed in a different font. In FIG. 4, a window 40 shows the results of a change in font size where the window layout procedure does not incorporate the invention. Window 40 includes a number of child windows 42, 44, 46 and 48. It is to be noted that boundaries of a window need not necessarily be displayed (e.g., see windows 42 and 48). As window 40 is not of the canvas window class, a change in font size will not automatically cause a resizing and rearrangement of the child windows within window 40. Thus, a font change may cause the text to be clipped (e.g. windows 42, 46 and 48) or to be oversized for a prescribed window area (e.g. window 44). By contrast, FIG. 5 illustrates a set canvas window 50 that is produced by a procedure that automatically causes child windows to be resized so as to accommodate a changed font size.

Each canvas window type includes, as above indicated, a layout routine that is capable of handling, automatically, changes in font size, an implementation of a new language or a new display resolution. Child window data structures do not include layout routines, but rather include a series of flags that define the child window's state. The layout routine of the parent canvas window uses those flags to manage the presentation of its included child windows, specifically looking for the flags that indicate that the canvas window needs to run its layout routine to update the child window presentation. Each parent canvas window runs its layout routine if a flag indicates that a child window needs to be updated. For instance, each window pre calculates a minimum size that it must have to properly display its contents. If a canvas window receives a flag from a child window that indicates that the minimum size of the child window has changed, the canvas window must update the size and position of all of its child windows.

While a number of flags are used, the flags employed to implement the invention are as follows:

1. Size changed—This flag is turned on to notify a canvas window that it has been resized and consequently needs to update how its child windows are laid out.
2. Minimum size changed—This flag is turned on in a child window when the space needed by the child window (i.e. its minimum size) has changed for any reason (e.g. text has changed).

3. Font changed—This flag is set in a child window when a font change notification is received from the presentation system. It causes a recalculation of the width and height of the child window and will typically cause the minimum size of the child window to change.

4. Layout changed—This flag is set by a request that is passed to the canvas window and is used by the canvas window to signal that its layout of child windows needs to be updated.

Figure 6:
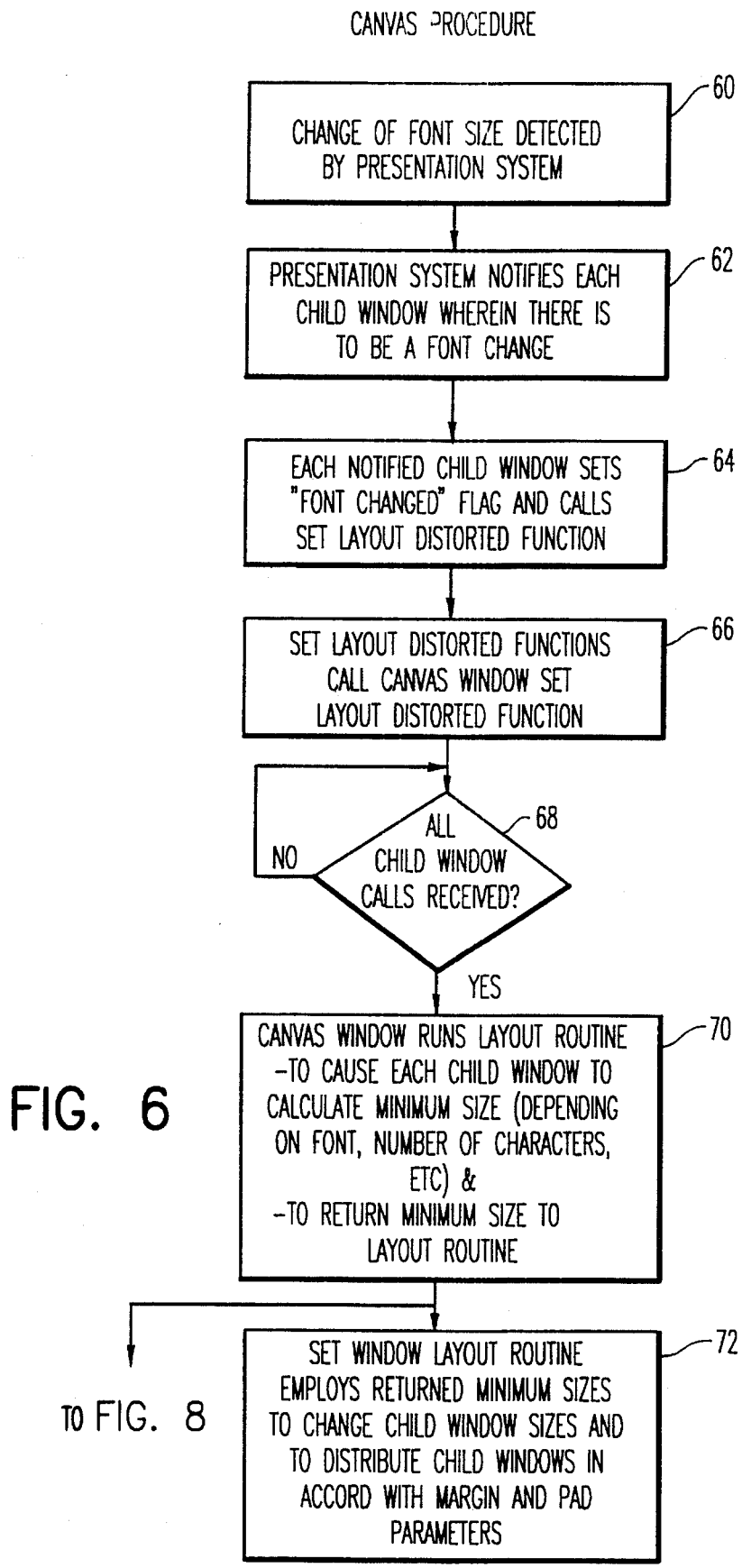
FIG. 6 is flow diagram illustrating the operation of the system of FIG. 1 in deriving the window presentation illustrated in FIG. 5.

Turning to FIG. 6, the method employed by the system of FIG. 1 to automatically reconfigure a set canvas window will be described. Initially assume that the presentation system has detected that a change of font has been ordered (e.g. by the user) as shown in box 60. The presentation system responds by notifying each child window having text that there is to be a font change (box 62). Each notified child window sets a "font changed" flag and calls a "set layout distorted function" that is associated with the child window's data structure (box 64). Each child window's set layout distorted function then calls a corresponding set layout distorted function present in the parent canvas window procedure (box 66). This action notifies the canvas window procedure that its layout routine is to be operated. The canvas window procedure invokes its layout routine only after all child windows have either issued or not issued a call (box 68).

The canvas window procedure next runs the layout routine which causes each child window to calculate its minimum size. Details of the new font specification are accessed from the presentation system. The minimum size is the size a child window requires to accommodate the new font, the designated number of characters that are to be displayed in the window, etc. Each child window returns its minimum size value to the canvas window procedure (box 70). The canvas window layout routine then employs the minimum sizes from the child windows to re-arrange the canvas window layout, change window sizes and distribute windows in accordance with pre-specified margin values, pad values, and other layout configuration parameters.

Figure 7:
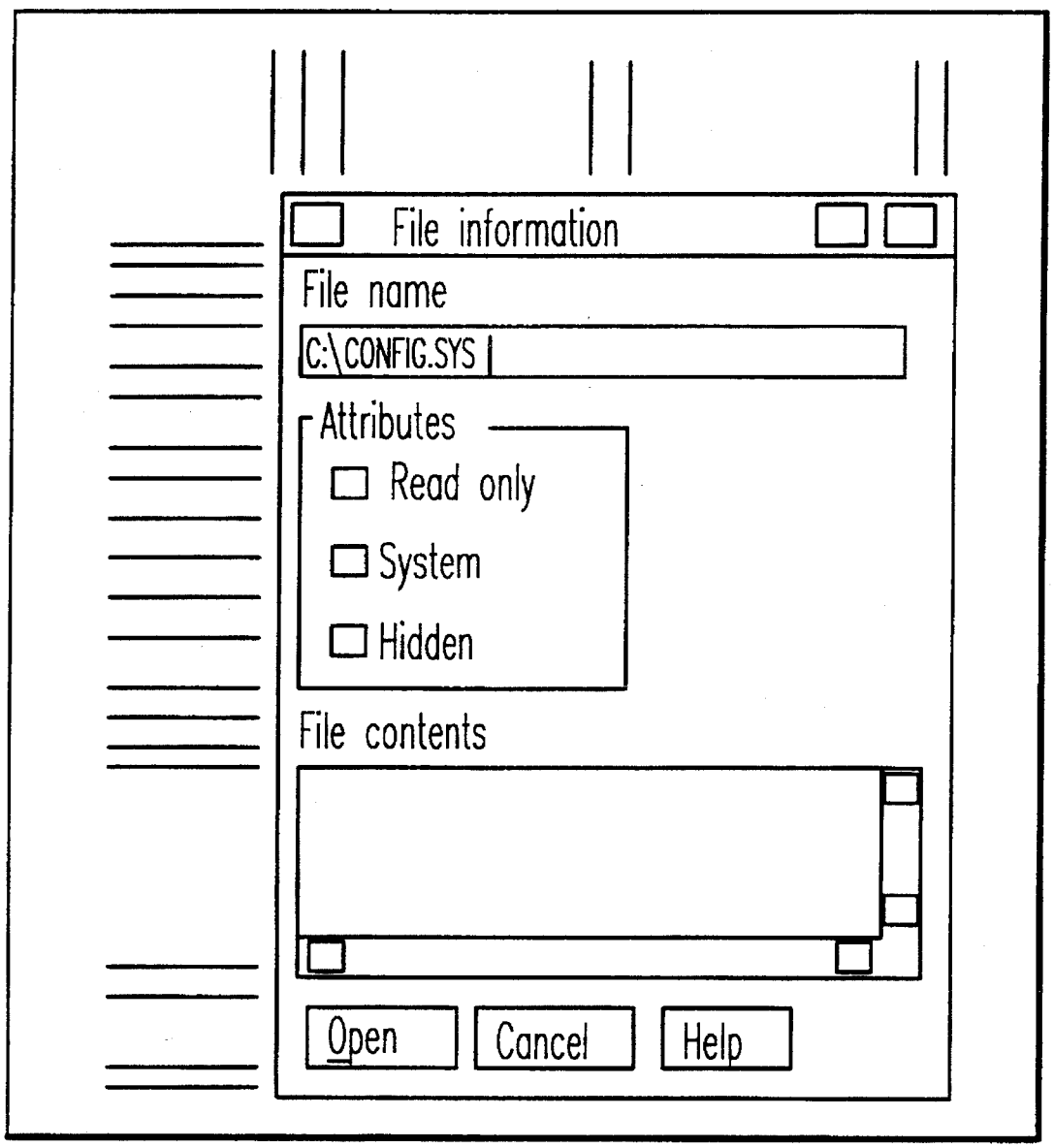
FIG. 7 illustrates a further class of window presentation, termed a "multi-cell canvas".

FIG. 7 illustrates a more complex canvas window type termed a multi-cell canvas. As can be seen, child windows are positioned into cells similar to a spread sheet by specifying a row and column location for each cell. The layout of a multi-cell canvas is complex since not all cells need to be filled; a child window is allowed to occupy multiple cells; child windows can overlap one another; sizes of empty rows and columns can be controlled; and all rows and columns may be expandable.

Figure 8:
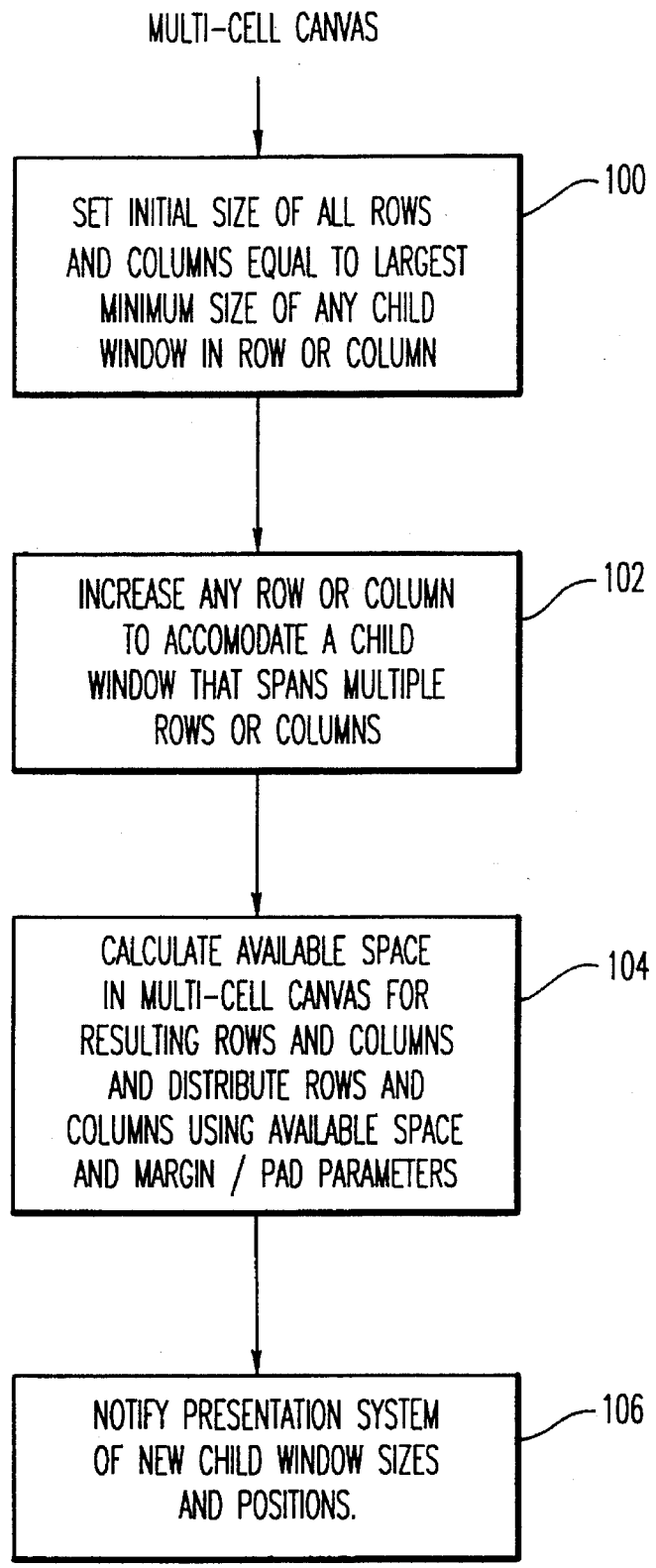
FIG. 8 is a flow diagram that illustrates how windows in a multi-cell canvas presentation are resized and repositioned in accordance with the invention hereof.

As a result of the increased complexity of the multi-cell canvas window, the procedure shown in FIG. 6 for the set canvas window branches after box 70 to the flow diagram shown in FIG. 8. Once each child window returns its minimum size to the multi-cell canvas window procedure, its layout procedure then sets an initial size of each row and column that is equal to the largest minimum size of any child window in the row or column (box 100). Next, the layout procedure increases the size of any row or column to accommodate any child window that spans multiple rows or multiple columns (box 102). After the aforesaid size adjustment of rows/columns, the layout procedure calculates and distributes the available space to the expandable rows and columns and distributes the rows and columns in accordance with preestablished parameters (box 104). Finally, the multi-cell canvas layout procedure notifies the presentation system of the new sizes and positions of the rows and columns and each of the child windows (box 106).

In summary, a graphical user interface that incorporates the invention automatically performs a new layout of child windows within a canvas window display. That layout action may be initiated by a notification from the presentation system to the child windows that a change has occurred in font or in the amount of text in a window. The layout routine will also respond at program initiation to a new display resolution. No user interaction is needed to implement the altered child window presentation.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for controlling a graphical user interface to enable a computer to display window configurations containing user-perceivable data, said method implemented by a software presentation system that automatically adjusts window presentation in accordance with window environment changes, including changes in the user-perceivable data, said method implemented by a computer and comprising the steps of:

(a) operating said presentation system to create a display that includes child windows with user-perceivable data, said child windows positioned within a parent window which comprises a data structure including a child window layout routine;

(b) detecting an indicated change in child window environment;

(c) causing each child window to respond automatically to said change in child window environment to operate a child window procedure, associated with each child window, which calculates a minimum size of at least each child window which requires adjustment to accommodate said change in environment and reporting each said minimum size to said child window layout routine; and (d) operating said child window layout routine to reposition said child windows on said display, including adjusted size child windows, in accordance with child window spacing parameters associated with said child window layout routine.

2. The method as recited in claim 1, wherein said change in child window environment is a change in font size of said user-perceivable data.

3. The method as recited in claim 1, wherein said indicated change in child window environment further dictates a change in size of said parent window.

4. The method as recited in claim 1, wherein said indicated change originates from either a user input or from an operating application program.

5. The method as recited in claim 1, wherein said child windows are arranged in rows and columns, said child window layout routine in step (d) determining an initial size for each row and column in accordance with a largest minimum size of a child window positioned in a row or column, respectively.

6. The method as recited in claim 5 wherein step (d) increases a determined size of a row or column to accommodate any child window spanning more than a row or column, respectively.

7. The method as recited in claim 6 wherein available space within a parent window encompassing said child windows is calculated and said rows and columns are positioned in accordance therewith, taking into account prestored child window positioning parameters.

\* \* \* \* \*